United States Patent
Hall et al.

(10) Patent No.: US 12,255,454 B2
(45) Date of Patent: Mar. 18, 2025

(54) METHOD AND SYSTEM FOR OPERATION AND USAGE OF BATTERY ENERGY STORAGE IN A POWER GRID

(71) Applicant: B2U Storage Solutions Inc., Santa Monica, CA (US)

(72) Inventors: Freeman Stoflet Hall, Santa Monica, CA (US); Michael Joseph Stern, Westlake Village, CA (US); Greg Landreth, Austin, TX (US)

(73) Assignee: B2U STORAGE SOLUTIONS INC., Santa Monica, CA (US)

( * ) Notice: Subject to any disclaimer, the term of this patent is extended or adjusted under 35 U.S.C. 154(b) by 349 days.

(21) Appl. No.: 17/827,046

(22) Filed: May 27, 2022

(65) Prior Publication Data

US 2023/0387684 A1    Nov. 30, 2023

(51) Int. Cl.
*H02J 3/00*   (2006.01)
*G06Q 50/06*  (2024.01)
*H02J 3/32*   (2006.01)
*H02J 3/38*   (2006.01)

(52) U.S. Cl.
CPC .............. *H02J 3/003* (2020.01); *G06Q 50/06* (2013.01); *H02J 3/004* (2020.01); *H02J 3/32* (2013.01); *H02J 3/381* (2013.01); *H02J 2300/24* (2020.01)

(58) Field of Classification Search
CPC .... H02J 3/003; H02J 3/004; H02J 3/32; H02J 3/381; H02J 2300/24; H02J 7/35; G06Q 50/06

See application file for complete search history.

(56) References Cited

U.S. PATENT DOCUMENTS

| | | | | |
|---|---|---|---|---|
| 8,588,989 | B1* | 11/2013 | Heath | H02J 13/00034 700/286 |
| 8,700,224 | B2* | 4/2014 | Mathiowetz | H02J 3/381 307/85 |
| 11,289,921 | B1* | 3/2022 | Hall | H02J 7/0014 |
| 12,024,048 | B2* | 7/2024 | Hishida | B60L 53/66 |
| 2011/0109158 | A1* | 5/2011 | Olsen | B60L 50/51 307/10.1 |
| 2011/0231028 | A1* | 9/2011 | Ozog | H02J 3/14 700/291 |
| 2012/0089261 | A1* | 4/2012 | Kim | H02J 13/00034 700/286 |
| 2013/0204443 | A1* | 8/2013 | Steven | G05B 13/04 700/286 |

(Continued)

FOREIGN PATENT DOCUMENTS

| | | |
|---|---|---|
| WO | 2021014363 A1 | 1/2021 |
| WO | 2021019444 A1 | 2/2021 |
| WO | 2022006159 A1 | 1/2022 |

*Primary Examiner* — Ramesh B Patel
(74) *Attorney, Agent, or Firm* — Panitch Schwarze Belisario & Nadel LLP

(57) ABSTRACT

A system and method for supplying power to a power grid. The system includes a battery storage system; and a power management system, the power management system including a storage management system with a processor configured to: direct generated energy to the battery storage system; discharge battery-stored energy from the battery storage system to the power grid; and control the discharge of the battery-stored energy from the battery storage system to the power grid based on a demand index.

19 Claims, 8 Drawing Sheets

(56) References Cited

U.S. PATENT DOCUMENTS

| | | | |
|---|---|---|---|
| 2014/0052305 A1* | 2/2014 | Kearns | G05F 1/66 |
| | | | 700/295 |
| 2014/0070756 A1* | 3/2014 | Kearns | H02J 13/00034 |
| | | | 320/101 |
| 2015/0180259 A1* | 6/2015 | Yoo | H02J 7/00308 |
| | | | 320/135 |
| 2015/0288212 A1* | 10/2015 | Kim | H02H 3/24 |
| | | | 307/80 |
| 2017/0237259 A1* | 8/2017 | Yoon | H02J 7/007 |
| | | | 307/20 |
| 2017/0256952 A1* | 9/2017 | Sugahara | H02J 3/004 |
| 2020/0059098 A1* | 2/2020 | Dong | G06Q 50/06 |
| 2021/0296897 A1* | 9/2021 | Cruickshank, III | H02J 3/14 |
| 2022/0209546 A1* | 6/2022 | Hall | B60L 53/60 |
| 2024/0154423 A1* | 5/2024 | Mun | G01R 31/40 |

\* cited by examiner

METHOD AND SYSTEM FOR OPERATION AND USAGE OF BATTERY ENERGY STORAGE IN A POWER GRID

INCORPORATION BY REFERENCE

This application incorporates by reference in their entirety U.S. application Ser. No. 17/382,933 filed on Jul. 22, 2021, and U.S. application Ser. No. 17/118,497 filed on Dec. 10, 2020.

TECHNICAL FIELD

The present disclosure generally relates to an energy storage system, and more particularly to method and system for operation and usage of battery energy storage in a power grid.

BACKGROUND

The ability to dynamically schedule power and operate a battery energy storage system (ESS), or battery storage system, as a responsive resource within the power grid's wholesale market is essential to operate the ESS effectively.

Accordingly, it would be desirable to optimize the contribution to and/or receiving of power from a power grid with respect, for example, to a battery storage system or battery storage facility that takes into account multiple variables based on a demand index.

SUMMARY

In accordance with an aspect, a system is disclosed for supplying power to a power grid, the system comprising: a battery storage system; and a storage management system with a processor configured to: direct generated energy to the battery storage system; discharge battery-stored energy from the battery storage system to the power grid; and control the discharge of the battery-stored energy from the battery storage system to the power grid based on a demand index.

In accordance with another aspect, a method is disclosed for supplying power to a power grid, the method comprising: directing generated energy to a battery storage system; and controlling a discharge of battery-stored energy from the battery storage system to the power grid based on a demand index.

DETAILED DESCRIPTION

Figure 1:
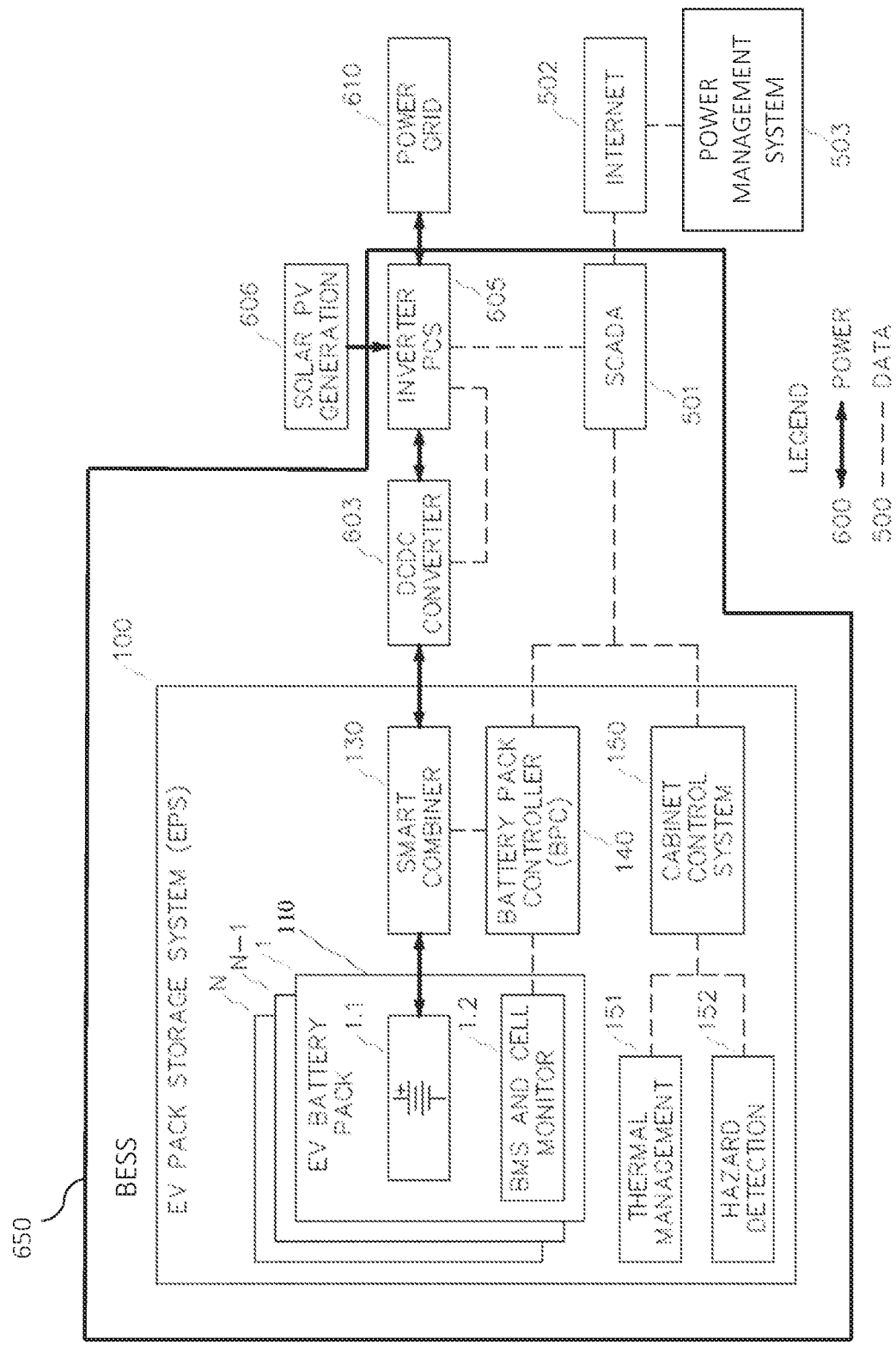
FIG. 1 is a block diagram illustrating the utility as part of an energy storage system in accordance with an exemplary embodiment.

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In some instances, well known methods and structures have not been described in detail so as not to unnecessarily obscure the embodiments.

In accordance with an aspect, an EV pack storage system (EPS) employs the EV battery packs as an integrated functional unit or building block wherein a plurality of EV battery packs are rather easily aggregated to behave as a larger battery within an ESS. The batteries can be racked in a specialized environmentally controlled enclosure in the original pack casing in which the batteries were mounted in the EV. The specialized environmentally controlled enclosure functions as an integrated EV pack storage unit and the EPS functions as a sub-system building block within the overall ESS. The EV battery packs within the EPS may be electrically connected in series as well as in parallel. Each series string is protected with an overcurrent device. The EPS enclosure is designed for easy installation, removal and replacement of EV battery packs. Each battery pack and string may be monitored with a proprietary battery pack controller (BPC). The BPC helps ensure proper operating parameters and monitors the health of each EV battery pack. The battery pack controller (BPC) can monitor the health of each EV battery pack by interfacing with the EV pack integrated battery management system (BMS). The BPC manages a smart combiner (SC) to actively balance the second-life batteries in order to effectively utilize the charge and discharge cycle of individual packs adjusting for variance in each pack's capacity. The environment of the EPS enclosure is managed to maintain suitable operating temperatures, and for hazard detection. The EPS operates within a larger ESS that also includes an inverter Power Conversion System (PCS) and Supervisory Control and Data Acquisition (SCADA). Multiple EPS can operate in integrated fashion together within an ESS. The ESS can be configured as DC-coupled, or AC-coupled to the inverter. The EPS can be charged from on-site generation such as solar or wind, or from electricity provided by the AC power system. The EPS within the ESS can be deployed in front of the meter (IFM) directly interconnected to the grid or deployed behind the meter (BTM) to offset a customer's load and demand.

In accordance with an exemplary embodiment, an integrated system is disclosed for deploying a plurality of second-life electric vehicle (EV) battery packs within an energy storage system (ESS).

In the present disclosure, herein referred to as the EV pack storage system (EPS), is an exemplary integrated functional building block wherein a number of EV battery packs are easily aggregated to behave as a larger battery within an overall ESS, although use of other battery formations is contemplated. The EPS composition and function can include: (1) the EV battery packs are utilized, both mechanically and electrically, as they were in the original first-life vehicle application, incorporating the battery pack's battery management system (BMS) as well as a similar digital serial data link format and protocol; (2) the EV battery packs are electrically configured in a parallel arrangement and often in series. EV battery packs may not have been originally designed for use in series connection but this limitation is overcome with a unique design for mounting, communicating and interconnecting; (3) a number of EV battery packs are integrated into an environmentally controlled and monitored cabinet or enclosure which is not considered an occupiable space according to building or fire code definitions, and where a single enclosure, or multiple enclosures, can be integrated in the ESS; (4) a battery pack controller (BPC) is deployed as part of the EPS to integrate the communications and controls necessary for the batteries to work together and operate in coordination as a unified functional block; and (5) a smart circuit combiner provides electrical balancing and overcurrent protection for all EV battery packs within the EPS.

FIG. 1 is a block diagram illustrating the utility of the disclosure in a preferred embodiment as part of a grid-tied energy storage system. In accordance with an exemplary embodiment, the EV pack storage system (EPS) 100 can be implemented as part of an overall energy storage system (ESS). For example, the energy storage system (ESS) can be a battery energy storage system (BESS) 650. In FIG. 1, heavy lines 600 with arrowheads indicate power connections and possible power flow directions, and dashed lines 500 indicate bidirectional digital data bus connections.

EPS 100 includes a plurality of EV battery packs 110, designated in FIG. 1 as blocks 1, N-1 and N to indicate any number N of identical EV battery packs. EV battery pack 1 contains batteries 1.1 and Battery Management System (BMS) 1.2. The EV battery pack batteries 1.1 through N.1 are connected in series/at nominal voltages, which are multiples of a single pack's nominal voltage. A number N of EV battery packs are connected in a series/parallel configuration or otherwise aggregated within smart combiner 130 to electrically behave as a larger battery within the overall energy storage system. A smart combiner 130 is connected to a bidirectional DCDC (DC-to-DC) converter 603. A DCDC converter 603 can provide an optimum voltage match between the aggregate EV battery packs and the Inverter Power Conversion System (PCS) 605 to provide an optimum voltage match as the maximum power point of solar PV generation 606 changes with temperature and load. A smart combiner (SC) 130 can be used to actively balance the second-life batteries in order to effectively utilize the charge and discharge cycle of individual packs adjusting for variance in each pack's capacity.

When the overall system is delivering energy stored in the EV battery packs, for example, to a power grid 610, DC power flows from the EV battery packs, through smart combiner 130 and through DCDC converter 603. DC power is then converted to AC power by PCS 605 to supply energy to the power grid 610. Power from solar photovoltaic generation 606, when available, for example, can also flows through PCS 605, which functions as a DC to AC power converter to discharge power into power grid 610. In this configuration, the total power into power grid 610 can be, for example, a combination of battery sourced power and solar photovoltaic sourced power.

In accordance with an exemplary embodiment, when the overall system is delivering energy to charge EV battery packs 1 through N, PCS 605 functions as an AC to DC power converter by sourcing AC power from power grid 610 and converting it to DC power. This DC power flows through DCDC converter 603, through smart combiner 130 and into all EV battery packs 1 through N. Power from solar photovoltaic generation 606, when available, can either be used to reduce the power required from power grid 610 to charge EV battery packs 1 through N or if the power from available solar power generation 606 is greater than the power required to charge these EV battery packs, then the excess power can be delivered to power grid 610. Some system variants will not include solar PV onsite generation 606 and therefore DCDC converter 603 may not be required. In accordance with an exemplary embodiment, EV battery packs 1 through N may be charged from the grid. In this case, PCS 605 functions as an AC to DC power converter by sourcing AC power from power grid 610 and converting it to DC power.

In accordance with an exemplary embodiment, a battery management system (BMS) 1.2 monitors every cell in the EV battery pack 1, primarily to check for mismatched, undercharged or overcharged cells in a series string. By monitoring and rebalancing mismatched cells, the usable lifetime of the EV battery pack can be enhanced, and battery cell and pack safe operating parameters can be ensured to avoid hazardous conditions. A Battery Pack Controller (BPC) 140 communicates with individual EV battery packs 1 through N over a digital data bus. Supervisory Control and Data Acquisition (SCADA) 501 communicates with BPC 140 to ascertain the state of charge, state of health and overall availability of the aggregate EV battery packs. In accordance with an exemplary embodiment, SCADA 501 receives top level commands from power management system 503 via internet 502 to control the operation of the overall energy storage system.

SCADA 501 can also communicate with a cabinet control system 150. Within EPS 100, the cabinet control system 150 can communicate with thermal management block 151 and the hazard protection block 152. Thermal management block 151 provides air conditioning, dehumidification, venting, and air circulation as required to maintain an optimum environment for EV battery packs 1 through N. The hazard detection block 152 monitors the environment inside the EPS 100 enclosure for smoke and over/under temperature conditions.

Figure 2:
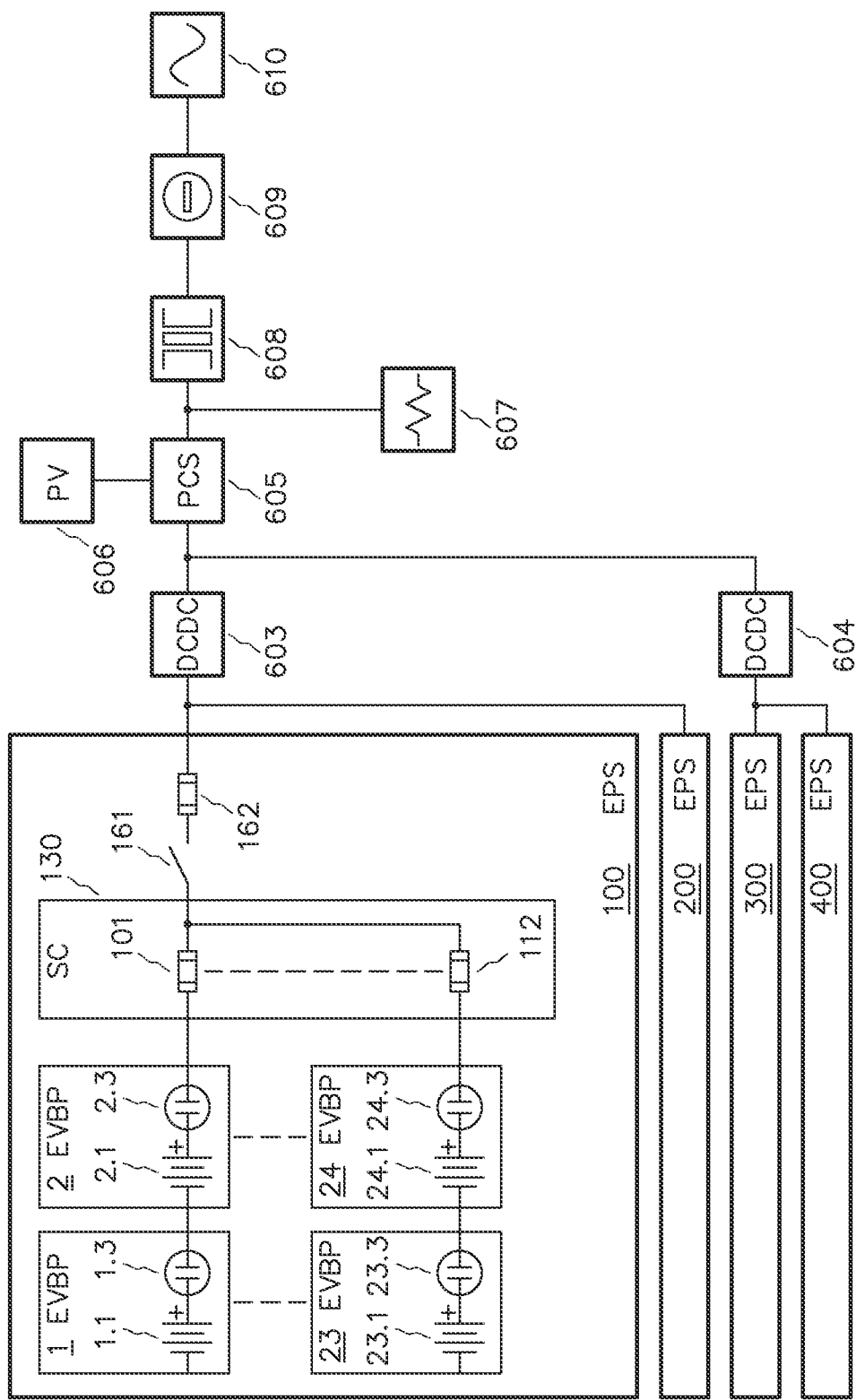
FIG. 2 is a modified electrical single-line schematic diagram of an energy storage system in accordance with an exemplary embodiment.

FIG. 2 is a modified single-line electrical diagram of an energy storage system in accordance with an exemplary embodiment and illustrates the power flow. This disclosure and description does not limit, however, the scope of the disclosure to systems with the number of elements and/or components described herein.

As illustrated in FIG. 2, the energy storage system, for example, has four EV pack storage assemblies (EPS) 100, 200, 300 and 400. Each EPS 100, 200, 300, 400, can be identical. However, each EPS may not be identical and modifications of one or more the EPSs 100, 200, 300, 400 may occur. In accordance with an exemplary embodiment, the EPS 100 contains 24 EV battery packs (EVBP) designated 1-24. Within each EVBP are a number of series or series parallel connected battery modules shown as 1.1 in EVBP 1 through 24.1 in EVBP 24. There is also normally an open contactor, which may be configured as one or more series connected contactors designated, 1.3 in EVBP 1 through 24.3 in EVBP 24. EVBP 1-24 may also contain other power circuits, such as but not limited to pre-charge resistors and contactors. In this exemplary system, EVBP 1 through 24 are connected in a 2S12P circuit arrangement where EVBP pairs are connected in series and where 12 of these series strings are connected in parallel. The series strings pairs are 1/2, 3/4, 5/6, 7/8, 9/10, 11/12, 13/14, 15/16, 17/18, 19/20, 21/22, and 23/24. Each of the 12 series strings 1/2 through 23/24 are connected through fuses 101 through 112, respectively, in smart combiner 130. Fuses 101 through 112 provide a second tier of overcurrent protection to protect the EV batteries 1.1 through 24.1 from over-currents under abnormal conditions. Fuses 101 through 112 can also prevent contactors 1.3 through 24.3 from breaking currents outside safe contactor limits. Contactors 1.3 through 24.3 can provide the first tier of overcurrent protection, for currents less than fuse 101 through 112 ratings, as well as other circuit isolation and connection control functions. The output of smart combiner (SC) 130 is connected to switch 161, which connects or isolates the power circuits of EPS 100 from the other energy storage system components. Fuse 162 protects the ampacity of conductors and the break capability of switch 161. In accordance with an exemplary embodiment, circuit breakers or other overcurrent devices and systems may be substituted for fuses in FIG. 2.

In this system example, EPS 100 and 200 are connected to DCDC converter 603. EPS 300 and 400 are connected to DCDC converter 604. DCDC converter 603 can provide an optimum voltage match between parallel connected EPS 100 and EPS 200 and the inverter power conversion system (PCS) 605 to provide an optimum voltage match as the maximum power point of solar PV generation 606 changes with temperature and irradiance. Both DCDC converters 603 and 604 are capable of bidirectional power transfer, to either charge or discharge EV battery packs. PCS 605 is also bidirectional with respect to power flow.

When the overall system, for example, is delivering energy stored in EPS 100, 200, 300 and 400 batteries to power grid 610 and/or local loads 607, DC power flows from EPS 100 and 200 through DCDC converter 603 and in parallel from EPS 300 and 400 through DCDC power converter 604. DC power can then be converted to AC power by PCS 605. AC power then flows through distribution transformer 608, where the voltage can be raised to more efficient distribution voltage levels and through revenue meter 609 before connection to power grid 610. Power from solar photovoltaic generation 606, when available and utilized, also flows through PCS 605 and PCS 605 functions as a DC to AC power converter to source power into power grid 610 and/or local loads 607. The total power into power grid 610 can be the sum of battery sourced power plus solar photovoltaic sourced power minus the power used by local loads 607. Local loads may also be supported without a connection to power grid 610 in which case PCS 605 works in a "stand alone" AC voltage regulation mode.

When the overall energy storage system is delivering energy to charge EV battery packs in EPS 100, 200, 300 and 400, PCS 605 functions as an AC to DC power converter by sourcing AC power from power grid 610 and converting AC to DC power. In accordance with an exemplary embodiment, the DC power flows through DCDC converters 603 and 604 to charge EV battery packs in EPS 100, 200, 300 and 400. Power from solar photovoltaic generation 606, when available, for example, can either be used to reduce the power required from the power grid 610 to charge EV battery packs, or if the power available from solar power generation 606 is greater than the power required to charge these EV battery packs and supply local "behind the meter" loads 607, then the excess power can be delivered to power grid 610.

In accordance with an alternate embodiment as shown in FIG. 2, the energy storage system can include one or more of the following: PCS 605, DCDC converter 603, transformer 608 and power meter 609, as part of the integrated EPS 100.

Figure 3:
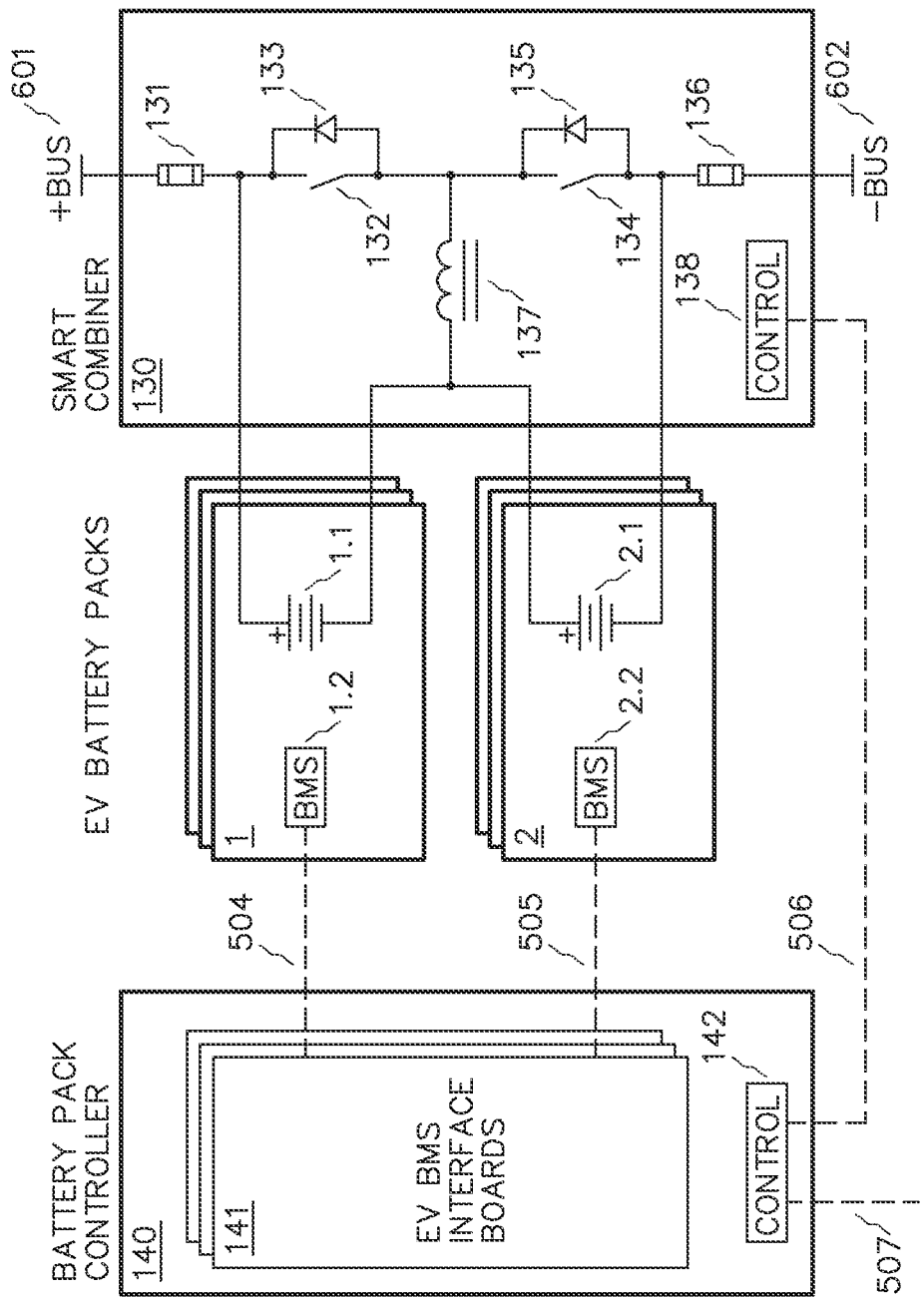
FIG. 3 illustrates a battery pack controller (BPC) and smart combiner (SC) in accordance with an exemplary embodiment.

FIG. 3 is a detailed drawing of the battery pack controller 140 and smart combiner 130 as shown in FIG. 1. Reference designator 1 indicates a plurality of EV battery packs (EVBP) with EVBP 1 on top. Reference designator 2 indicates a plurality EVBP with EVBP 2 on top. EVBP 1 and 2 are electrically connected in series as the first series pair in this EPS embodiment. Each series pair within the EPS communicates with one EV BMS interface board (EVIB) within in the BPC. In this first, top level case, BMS 1.2 and BMS 2.2 communicate with EVIB 141 over digital data buses 504 and 505, respectively. The communication protocol is a controller area network bus (CAN bus) as used in the original manufacturer's electric vehicle application. All other EVBP series pairs within the EPS communicate in a similar way. Control circuit 142 aggregates the data from all EVIB within BPC 140 and provides a Modbus digital communication link 507 to a system controller external to the EPS and Modbus link 506 to smart combiner 130. In accordance with an exemplary embodiment, the Modbus digital communication link 507 communicates with the overall energy system SCADA (element 501 in FIG. 1) to report the health, availability and state of charge of the "composite" battery configured from the series/parallel connection of all EV battery packs. Modbus data link 506 connects control circuit 142 to control circuit 138 to actively control the balancing of each EV battery pack in a series string.

In accordance with an exemplary embodiment, the balancing of each EV battery pack in a series string, for example, can be achieved by monitoring the voltage, current and temperature of each EV battery pack and then transferring energy from the higher voltage of the two packs in a series string to the lower voltage pack. For example, if EVBP 1 has a higher voltage than EVBP 2, then semiconductor switch 132 is closed, current flows from battery 1.1 through inductor 137, semiconductor switch 132 is opened and the current through inductor 137 flows through diode 135 and into battery 2.1 completing one energy transfer cycle. This energy transfer cycle is repeated at high frequencies for an amount of time proportional to the desired energy transfer. If EVBP 2 has a higher voltage than EVBP 1, then semiconductor switch 132 is closed, current flows from battery 2.1 through inductor 137, semiconductor switch 132 is opened and the current through inductor 137 flows through diode 133 and into battery 1.1 completing one energy transfer cycle.

FIG. 3 illustrates a method of balancing batteries in a series battery string but does not limit the disclosure to any one battery balancing method or number of EVBPs in a series string. In accordance with an exemplary embodiment, the energy storage system includes the interconnections and inter-functionality of the battery pack controller 140, EV battery pack battery management systems, 1.2 and 2.2 in this example, smart combiner 130 and overall system controller via data link 507. Fuses 131 and 136 can be used to provide fault isolation between EVBP 1 and 2 series string and the parallel circuits of all series strings +BUS 601 and −BUS 602. In accordance with an exemplary embodiment, all other series strings, for example, can be protected in a similar manner.

Figure 4:
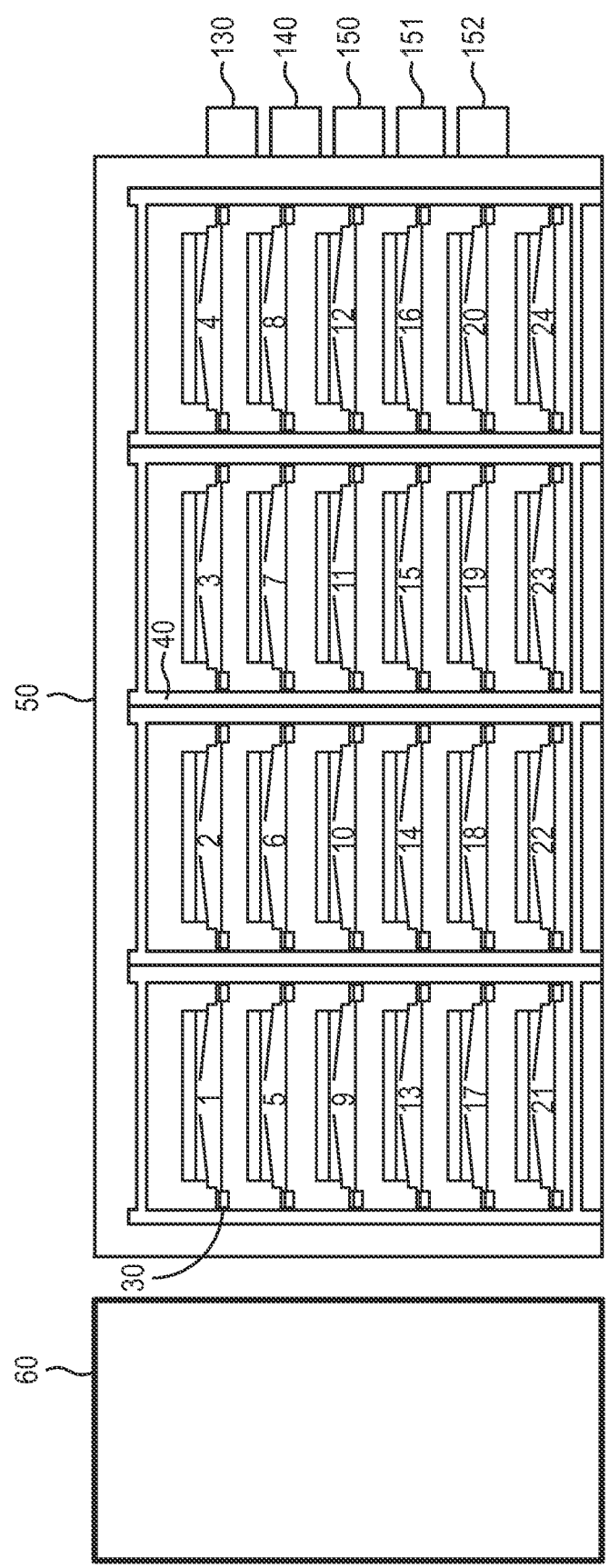
FIG. 4 illustrates the mechanical layout of an enclosure component in accordance with an exemplary embodiment.

In accordance with an exemplary embodiment, the energy storage system can include each of the elements shown in FIG. 1 within EV pack storage system (EPS) box 100 plus a weatherproof enclosure and a racking system for the EV battery packs. FIG. 4 illustrates an embodiment of the enclosure, which can include fixed and removable exterior insulated panels 60. The enclosure 50 can be designed, for example, as a cabinet where the battery system and system controls are accessible from outside the enclosure, and the enclosure or cabinet is not an occupiable space as defined in building or fire codes. In accordance with an exemplary embodiment, the enclosure 50 is an outdoor rated enclosure that enables outdoor deployment of the energy storage assembly.

In accordance with an exemplary embodiment, the racking system 40 can be fabricated from structural steel and configured to hold EV battery packs 1 through 24. Each pack in the present build of the EV pack storage system (EPS), for example, can weighs in excess of 600 pounds. The side panels 60 of the enclosure 50 can be removed, for example, to allow forklift access to rather easily install and remove EV battery packs 1 through 24. In addition, the racking system 40 is designed to allow airflow between the EV battery packs. For example, each EV battery pack can be electrically isolated from the racking system 40 by a standoff 30. The EV battery packs, for example, can be cooled and heated by a thermal management system 151 under the direction of cabinet control system 150. The thermal management system 151 may include cooling, dehumidification, and other environmental controls as a means for extending the useful lifetime of the EV battery packs. A hazard detection system 152 can provide alarms to cabinet control system 150 when smoke, gasses or temperature conditions outside of an operational range are detected.

The smart combiner 130 and battery pack controller 140 functions are described in connection with the FIG. 1 narrative. The smart combiner 130, the battery pack controller 140, the cabinet control system 150, the thermal management system 151 and the hazard detection system 152 are not shown to scale or with specific physical features. In one or more of the smart combiner 130, the battery pack controller 140, the cabinet control system 150, the thermal management system 151 and the hazard detection system 152 can be mounted to the EPS enclosure. In accordance with an exemplary embodiment, the fixed and removable exterior panels 60 of the enclosure 50 may be thermally insulated.

It is emphasized that while the above description relates to a particular embodiment of a battery storage that has certain advantages, other configurations, electronic components, physical storage, battery types, battery layout and interconnections and other components are contemplated as being useful and appropriate to the following method and system for operating same in conjunction with a power grid.

In accordance with an exemplary embodiment, it would be desirable to have a method and system for operation and usage of an energy storage system (e.g., a battery energy storage system (BESS)) 650, for example, an electric vehicle pack storage system (EPS) 100 or the like in a power grid 610, for example, supplying energy from a power generation source 640, such as generated from solar photovoltaic (PV) 606 (FIG. 1) and stored in the energy storage system 650. Other sources of power generation 640, for example, can include fuel cells and wind generation. In the FIG. 5 example, the source of energy generation shown is photovoltaic (PV) generation 606 configured to transfer energy to the battery storage system 650. The energy (power) from the battery storage system 650 is subsequently transmitted or discharged to a power grid 610, for use at certain times. In accordance with an embodiment, the sources of power generation 640 can be on-site, for example, a site in which the battery energy storage system 650 is located and which may be owned and/or operated by the owners and/or operators of the energy storage system 650. Alternatively, the source of power generation 640 can be remote from the location of the energy storage system 650 and from a source that may not be owned and/or operated by the owned and/or operators of the energy storage system 650.

In addition, the delivery of energy from the energy storage system 650 can be both inter-market, for example, by comparing expected demand and prices in the day ahead market (DAM) and real-time markets (RTM), as well as intra-market, for example, by identifying the demand for stored energy from the battery storage system 650. The method and system as disclosed herein can also facilitate provision of both energy and ancillary services while ensuring that the providing of energy is consistent with other commitments (e.g. resource adequacy). The ancillary services can include one or more services necessary to support the transmission electric power from the energy storage system 650 or source of power generation 640 to the power grid 610 and consumers within the power grid 610. For example, the ancillary services can include providing a market place or power grid 610 with an available source of energy or backup power, if needed and which can be supplied on demand from the energy storage system 650.

Figure 5:
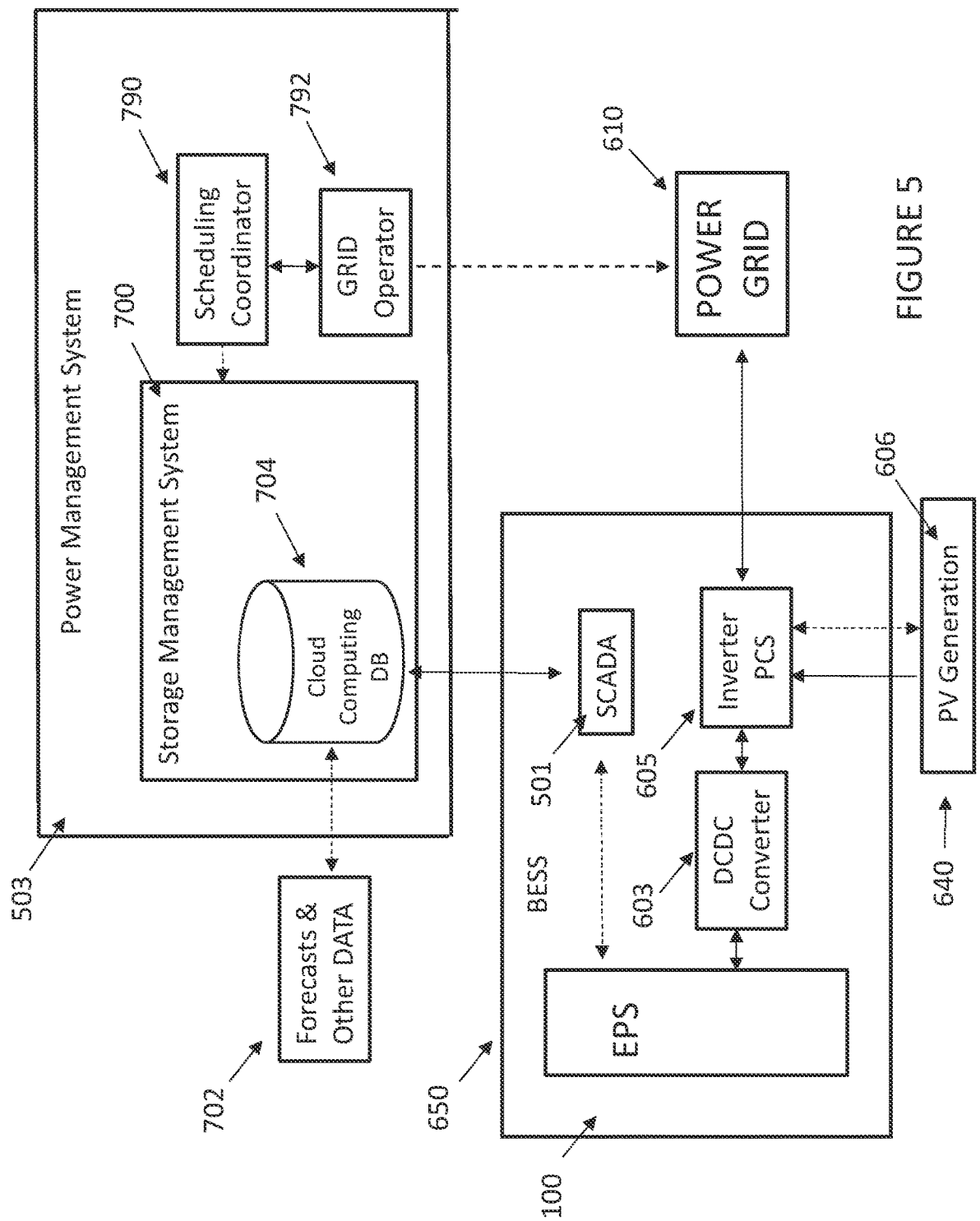
FIG. 5 illustrates a method and system for operation and usage of battery power in a power grid in accordance with an exemplary embodiment.

In accordance with an exemplary embodiment, the method and system can include a system 700 as shown in FIG. 5, which can be a component of the power management system 503 that can deliver generated energy to a power grid 610 by one or more of directing generated energy to a battery storage system 650, discharging battery-stored energy from the battery storage system 650 to the power grid 610, and directing the generated energy to the power grid 610. The storage management system 700 can be configured to receive data, for example, forecasts and other data 702, which can include inputs of historical demand and pricing and climate conditions as well as forecast conditions to create demand curves or demand indexes that govern, for example, the availability of the battery storage system 650 to provide energy, for example, to a power grid 610. The power grid 610 can be associated, for example, with a wholesale power market.

As shown in FIG. 5, the method and system for operation and usage of battery power in a power grid 610 can include a source of power generation 640, for example, a photovoltaic (PV) generation system 606, a power management system 503 in communication with an energy storage system (BESS) 650, for example, an integrated battery energy storage system 100, and a power grid 610. In accordance with an exemplary embodiment, the power management system 503 can include one or more systems (or modules) in the form of a storage management system 700 that can be run sequentially to ultimately produce the demand curves that communicate the availability of the energy storage system 650 to relevant wholesale power markets. The storage management system 700 can include a cloud computing database (DB) 704 configured to receive and store forecasts and other data 702 as disclosed herein.

In addition, the power management system 503 can include a scheduling coordinator 790 configured to schedule and coordinate the delivery of power, for example, from the energy storage system 650 to the relevant market, for example, the power grid 610. The power management system 503 also includes access to a grid operator or system 792 that is in communication with the scheduling coordinator 790 and the power grid 610.

In accordance with an exemplary embodiment, the relevant market can be a power grid 610 that includes a demand for energy in both a day ahead market (DAM) and a real-time market (RTM). In accordance with an exemplary embodiment, the storage management system 700 can include the cloud computing database 704 configured to receive weather forecast and historical demand data 702, for example, from a cloud-computing service.

Figure 6:
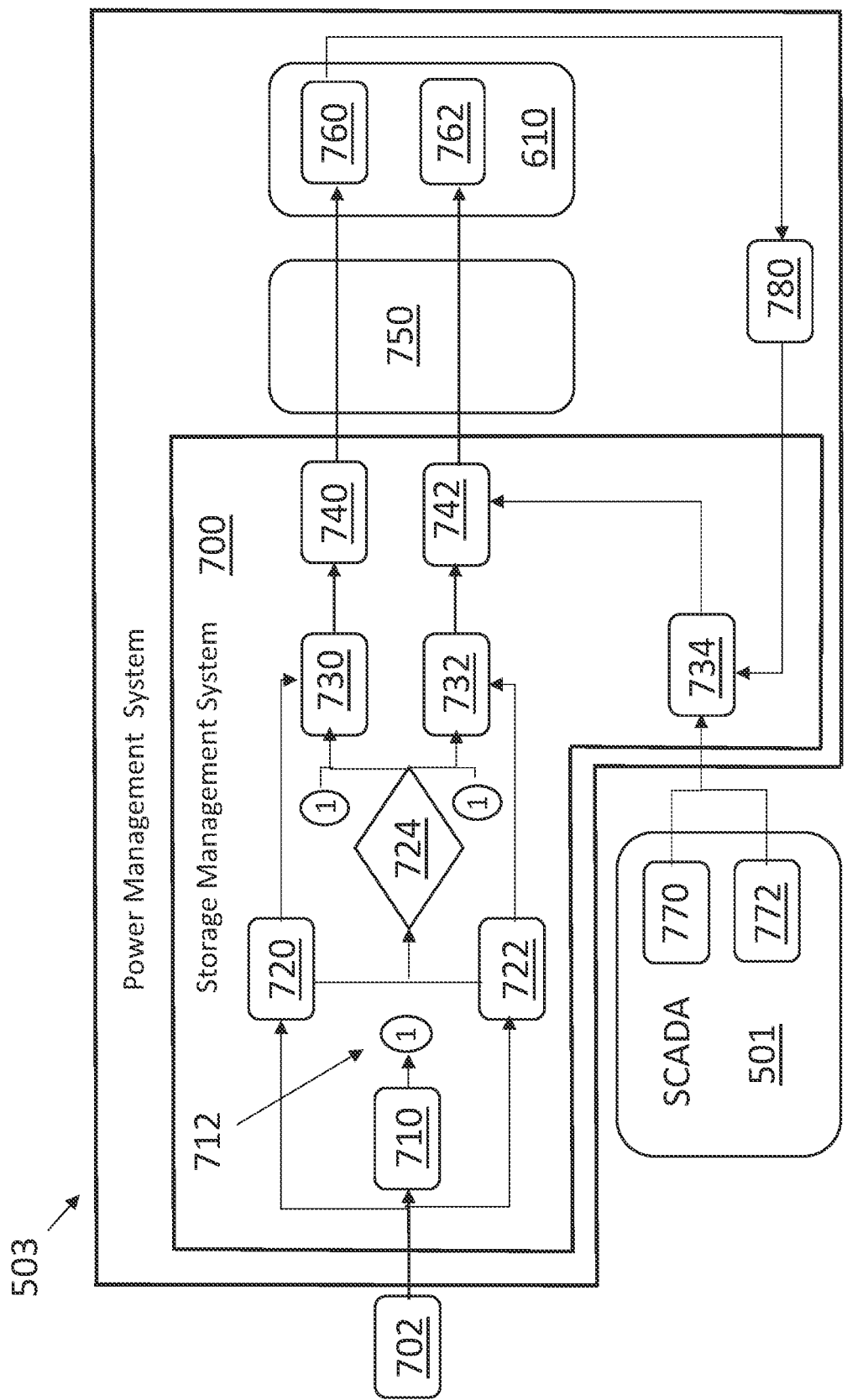
FIG. 6 illustrates a method and system for supplying energy to a power grid in accordance with an exemplary embodiment.

As illustrated in FIG. 6, the storage management system 700 can include, for example, a photovoltaic (PV) generation predictor 710, a day-ahead market (DAM) predictor 720, a fifteen-minute demand forecaster 722, a day-ahead market (DAM) demand generator 730, a real-time market (RTM) demand generator 732, and a real-time market (RTM) demand overwriter 734. The storage management system 700 can be configured to supply energy to a power grid 610, for example, to a power grid operated by the California Independent System Operator (CAISO). CAISO, for example, is a non-profit Independent System Operator serving California, which oversees the operation of California's bulk electric power system, transmission lines, and electricity market.

In accordance with an exemplary embodiment, the storage management system 700 can be configured to receive demand and supply information and produce forecasts of power supply, for example, generated by a solar photovoltaic (PV) generation system (e.g., solar farm) 606 and stored in the energy storage system 650 and/or providing other market products such as ancillary services. For example, in an exemplary embodiment, the energy storage system 650 is an integrated battery energy storage system 100 as disclosed herein. The demand and generation input data can include data input to the power management system 503 that can be drawn from a cloud database that can include historical demand including price for electrical energy at locational marginal prices (LMPs) in the day-ahead market (DAM) and real-time markets (RTMs), forecast climate conditions, and observed historical climate conditions. The CAISO's day-ahead and real-time markets can provide, for example, with the scheduling of resources to ensure operational reliability of the bulk electric grid in real-time. In addition, for example, the demand generation input data can be obtained via structured query language (SQL) connections built into the demand generation input data workbook. As to the CAISO data format, the demand curve and demand index can be expressed in fiat currency as the cost of the energy in these various time segments. Thus, in this example the demand index has a dual purpose of identifying projected demand based on weather predictions, historical demand and a potential myriad of other factors while also identifying the minimum or maximum levels of cost/compensation for consuming/supplying the power to the grid in the respective time segments. The presently disclosed system uses this information in conjunction with the potential and measured performance parameters of the energy storage system 650 described herein to optimize supply power to the power grid.

In accordance with an exemplary embodiment, when the source of energy is a photovoltaic (PV) generation system 606, the photovoltaic (PV) generation predictor 710 can receive weather forecast and data 702 for a given location for the PV generation system 606. The weather forecast and data can be input into an expected plane of array (POA) irradiance module of the PV generator 710 that can be configured to generate a plane of array irradiance (POA IRR) forecast that can be used to project the photovoltaic (PV) generation of the PV generation system 606, for example, in any given hour. In accordance with an example, the photovoltaic (PV) generator 710 can be configured to start with, for example, a "blue skies" estimate of POA IRR created by analyzing met station data, for example, from a solar farm since inception. The "blue skies" forecast is drawn from sampling the POA IRR data recorded at the solar farm 606, for example, over a given period of time.

In accordance with an exemplary embodiment, the PV generation forecast can take the blue skies POA Irradiance and can estimate PV generation based on the installed capacity of the PV generation system 606, which allows the storage management system 700 to estimate a factor of PV Generation:Measured POA_IRR by time of day. In addition, forecasted hourly ambient temperatures can be input to a regression relationship to estimate back of module PV array temperatures, which in turn can be used to derate forecast generations, for example, by reducing the power rating or energy generation forecasted by the PV generation system 606. The final PV generation forecast 712, for example, can be produced by adjusting these derated values based on expected global horizontal irradiance (GHI). In accordance with an exemplary embodiment, the final PV generation forecast 712 can also be adjusted In accordance with an exemplary embodiment, the storage management system 700 can be configured to determine the demand index based on estimates of the expected average hourly energy demands and/or corresponding prices for energy, for example, within the fifteen-minute market (FMM) granularity to determine whether the storage management system 700, for example, controls the discharge of the battery-stored energy in the day-ahead market (DAM) within one or more fifteen-minute markets (FMM). The day-ahead market (DAM) demand forecaster tool 720 in combination with the fifteen-minute market (FMM) forecast tool 722 can use the demand projections, for example, the FMM demand projections can be used to establish (1) which window of time, for example, a two-hour window will offer the highest demands and (2) expected demands for power being providing during the window of time.

In accordance with an exemplary embodiment, a demand estimator, for example, a FMM demands estimator, works from a database 724 of the last several years of locational marginal pricing (LMPs) and corresponding demands for energy within a defined region, plus forecast climate conditions, from which the storage management system 700 can estimate expected demand at any given hour of any given day based on conditions/criteria (e.g., temperature, weekday/weekend, etc.) as well as standard deviations, etc. for providing energy to the power grid 610.

The day-ahead market (DAM) demand generator 730 integrates information from the data described above to determine day-ahead (DA) market demands and corresponding bid amounts and prices to sell. The DAM demand generator 730 can use forecasted PV generation to include any expected contributions from the photovoltaics (PV) to the total amount of energy to offer during the evening discharge window (DW), if any. In addition, the day-ahead market (DAM) demand generator 730 can take the expected demands in the two (continuous) highest-demand hours and apply a factor to set, for example, the price at which to offer battery-stored energy from the battery storage system 650 to the day-ahead market (DAM) in those two (2) hours. In theory, the factor can be a small premium (for example, 105% to 125%, for example 115%), which we would require from the day-ahead market (DAM) in order to give up on the potential upside that may materialize on any given day in the fifteen-minute market (FMM) due to greater volatility in that market.

In accordance with an exemplary embodiment, a real-time market (RTM) demand generator 732 integrates information for example, based on the state of charge (SOC) 770 and forecasts from the PV generator predictor 772, which is the same data and resources that are input into the day-ahead market (DAM) demand generator 730 for predicting available energy that the can be provided to the day-ahead market as disclosed. In addition, in combination with the DAM demand generator 730, the real-time market (RTM) demand generator 732 can create a schedule for providing the surplus generation from the PV system 606, via, for example, surplus energy (SE) and real-time sell bids designed to optimize, for example, daily revenues. In accordance with an exemplary embodiment, for example, offers to provide energy generated by the day-ahead market (DAM) demand generator 730, the fifteen-minute market (FFM) demand generator 732, and the real-time market (RTM) demand generator 732 can be uploaded to a scheduling coordinator (SC) and submitted to a system for the power grid 610, for example, a power grid operated by CAISO.

In accordance with an exemplary embodiment, the outputs from the DAM demand generator 730 and the RTM demand generator 732 can be, for example, comma-separated values (CVS) files that contain the complete demand curves for the coming days. CVS files can be uploaded to a cloud platform, where an automated process converts the csv files to the required formats for API upload 740, 742 to a scheduling coordinator in a market suite 750, for example, hosted by a power grid 610.

In accordance with an embodiment, API uploads 740, 742 can be scheduled to occur after markets open so that uploaded bids are directly submitted to the power grid 610, for example, CAISO, for consideration in the scheduled process. For example, with CASIO day-ahead market (DAM) bids 760 can be submitted from up to 7 days in advance until 10 AM the day before, while each day's real-time market (RTM) bids 762 open the day before at about 1:30 PM, with each trade hour closing 75 minutes in advance of the beginning of the hour.

In accordance with an exemplary embodiment, the storage management system 700 can also include a real-time market (RTM) demand overwriter 734 that makes automated adjustments to daytime demand curves (or demand indexes) for state of charge (SOC) for the battery storage system 650 and adjusted power or energy demands. The RTM demand overwriter 734 is configured to evaluate progress of battery charging of the battery storage system 650 before the close of each trade hour and determine how to supply battery-stored energy from the battery storage system 650 to the power grid 610 during a trade hour. For example, the RTM demand overwriter 734 can help ensure that the battery storage system 650, for example, the integrated battery energy storage system 100 is fully charged. For example, if the state of charge (SOC) of the battery storage system 650 (or the integrated battery energy storage system 100) is below desired or expected levels, the amount of "surplus generation", for example, excess PV generation that is not expect to be required to fully charge the batteries in advance of expected highest demand hours, in the next trade hour's demand curves can be reduced in order to make that power or energy generation available to charge the battery storage system 650. Alternatively, the discharge of energy to the power grid 610 can be a function of a desired state of charge (SOC) of the battery storage system 650.

In addition, the RTM demand overwriter 734 can adjust the opportunity cost thresholds for supplying additional energy when high demands occur in the FMM or RTM. Whereas, for example, the storage management system 700, uses demand forecasts and the corresponding demand index to set thresholds, in real-time, the results (for example, day-ahead market (DAM) clearing demands 780 of the day-ahead market (DAM)) can be obtained and the results can be used to set baseline demand expectations to which standard deviations can be added to set expected demands and corresponding opportunity costs for delivering additional power, for example, in a given hour. The storage management system 700 can also be configured to select one or more markets, for example, power grids 610 that provides a price point for selling energy in the day-ahead market.

Figure 7:
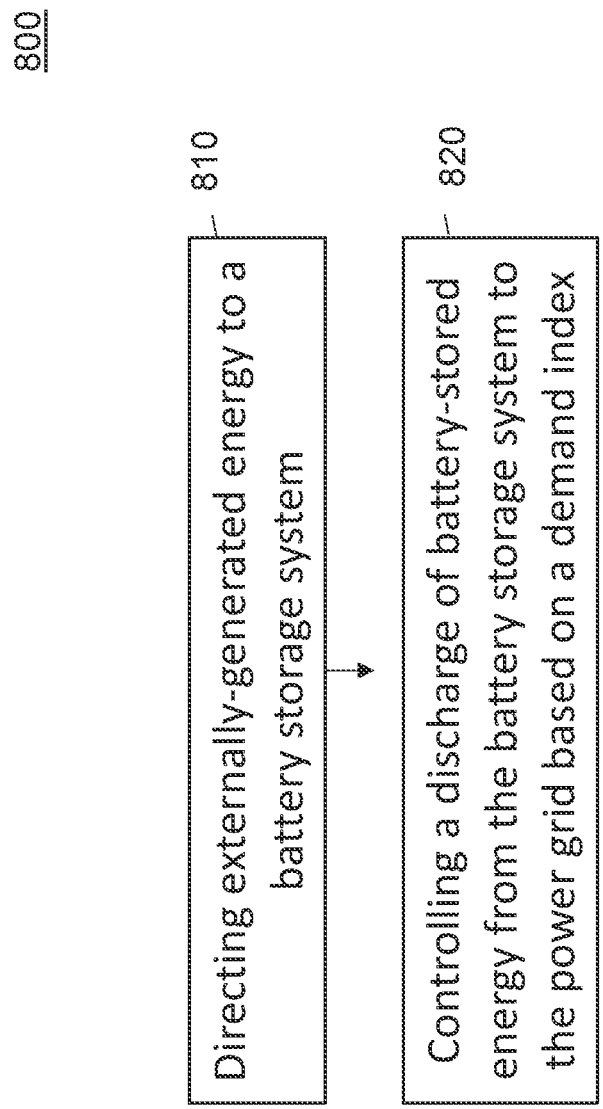
FIG. 7 illustrates a method for supplying power to a power grid in accordance with an exemplary embodiment.

FIG. 7 illustrates a method for supplying power to a power grid in accordance with an exemplary embodiment. As illustrated in FIG. 7, the method for supplying power to a power grid includes in step 810, directing generated energy to a battery storage system. In step 820, the method includes controlling a discharge of the battery-stored energy from the battery storage system to the power grid based on a demand index. In accordance with an exemplary embodiment, the demand index includes predicted power demands for the battery-stored energy. In another exemplary embodiment, the demand index includes market price for the battery-stored energy.

In accordance with an exemplary embodiment, the method further includes directing the generated energy to the power grid from a source of the generated energy based on the demand index, the demand index including one or more of market price for the generated energy, market price of the battery-stored energy, and a state of charge of the battery storage system.

In another exemplary embodiment, the method includes forecasting climate conditions for a photovoltaic generation system; observing historical climate conditions for the photovoltaic generation system; and discharging the battery-stored energy from the battery storage system to the power grid based on the demand index, and wherein the demand index includes the forecasted climate conditions for the photovoltaic system and the observed historical climate conditions for the photovoltaic generation system.

In accordance with an exemplary embodiment, the method includes storing historical location marginal prices (LMPs) for delivery of electrical power to a day-ahead market (DAM); and obtaining one or more of the historical locational marginal prices (LMPs), the forecasted climate conditions for the photovoltaic generation system, and the observed historical climate conditions for the photovoltaic system from a structure query language (SQL) connection built into a discharge data workbook.

In accordance with another exemplary embodiment, the generated energy is from a photovoltaic generation system, and the method includes projecting photovoltaic generation for a given time period based on an expected plane of array irradiance (POA IRR) forecast for the photovoltaic generation system; inputting forecasted hourly ambient temperatures into a regression relationship to estimate back of module photovoltaic (PV) array temperatures for the photovoltaic generation system; forecasting generation of the generated energy from the photovoltaic generation system based on incident irradiance and degradation due to the estimated back of module PV array temperatures; producing a final photovoltaic (PV) generation forecast for the photovoltaic system by adjusting the forecast generation based on an expected global horizontal irradiance (GHI) for the photovoltaic generation system; estimating an expected demand index in the day-ahead market (DAM) for the battery-stored energy; and determining one or more time frames to discharge the battery-stored energy to the power grid in the day-ahead market (DAM) based on the demand index in the day-ahead market (DAM) for the battery-stored energy.

Figure 8:
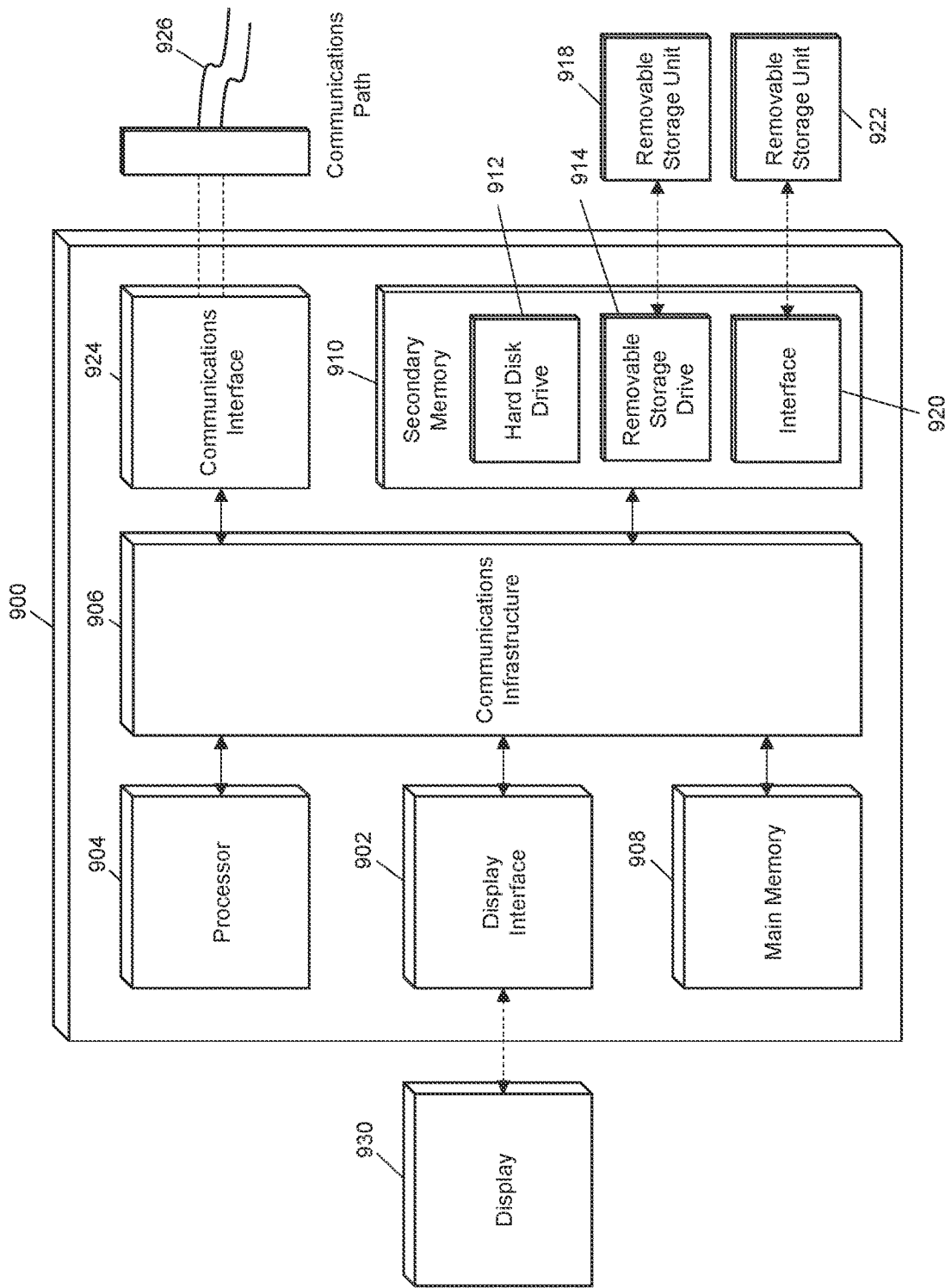
FIG. 8 illustrates an exemplary hardware architecture for an embodiment of a computer system.

FIG. 8 illustrates a representative computer system 900 in which embodiments of the present disclosure, or portions thereof, may be implemented as computer-readable code executed on hardware. For example, the BPC 140, the SCADA 501, the power management system 503, the storage management system 700, the cloud computing database 704, the scheduling coordinator 790, as disclosed herein may be implemented in whole or in part by a computer system 900 using hardware, software executed on hardware, firmware, non-transitory computer readable media having instructions stored thereon, or a combination thereof and may be implemented in one or more computer systems or other processing systems. Hardware, software executed on hardware, or any combination thereof may embody modules and components used to implement the methods and steps of the presently described method and system.

If programmable logic is used, such logic may execute on a commercially available processing platform configured by executable software code to become a specific purpose computer or a special purpose device (for example, programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 918, a removable storage unit 922, and a hard disk installed in hard disk drive 912.

Various embodiments of the present disclosure are described in terms of this representative computer system 900. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

A processor device 904 may be processor device specifically configured to perform the functions discussed herein. The processor device 904 may be connected to a communications infrastructure 906, such as a bus, message queue, network, multi-core message-passing scheme, etc. The network may be any network suitable for performing the functions as disclosed herein and may include a local area network ("LAN"), a wide area network ("WAN"), a wireless network (e.g., "Wi-Fi"), a mobile communication network, a satellite network, the Internet, fiber optic, coaxial cable, infrared, radio frequency ("RF"), or any combination thereof. Other suitable network types and configurations will be apparent to persons having skill in the relevant art. The computer system 900 may also include a main memory 908 (e.g., random access memory, read-only memory, etc.), and may also include a secondary memory 910. The secondary memory 910 may include the hard disk drive 912 and a removable storage drive 914, such as a floppy disk drive, a magnetic tape drive, an optical disk drive, a flash memory, etc.

The removable storage drive 914 may read from and/or write to the removable storage unit 918 in a well-known manner. The removable storage unit 918 may include a removable storage media that may be read by and written to by the removable storage drive 914. For example, if the removable storage drive 914 is a floppy disk drive or universal serial bus port, the removable storage unit 918 may be a floppy disk or portable flash drive, respectively. In one embodiment, the removable storage unit 918 may be non-transitory computer readable recording media.

In some embodiments, the secondary memory 910 may include alternative means for allowing computer programs or other instructions to be loaded into the computer system 900, for example, the removable storage unit 922 and an interface 920. Examples of such means may include a program cartridge and cartridge interface (e.g., as found in video game systems), a removable memory chip (e.g., EEPROM, PROM, etc.) and associated socket, and other removable storage units 922 and interfaces 920 as will be apparent to persons having skill in the relevant art.

Data stored in the computer system 900 (e.g., in the main memory 908 and/or the secondary memory 910) may be stored on any type of suitable computer readable media, such as optical storage (e.g., a compact disc, digital versatile disc, Blu-ray disc, etc.) or magnetic storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 900 may also include a communications interface 924. The communications interface 924 may be configured to allow software and data to be transferred between the computer system 900 and external devices. Exemplary communications interfaces 924 may include a modem, a network interface (e.g., an Ethernet card), a communications port, a PCMCIA slot and card, etc. Software and data transferred via the communications interface 924 may be in the form of signals, which may be electronic, electromagnetic, optical, or other signals as will be apparent to persons having skill in the relevant art. The signals may travel via a communications path 926, which may be configured to carry the signals and may be implemented using wire, cable, fiber optics, a phone line, a cellular phone link, a radio frequency link, etc.

The computer system 900 may further include a display interface 902. The display interface 902 may be configured to allow data to be transferred between the computer system 900 and external display 930. Exemplary display interfaces 902 may include high-definition multimedia interface (HDMI), digital visual interface (DVI), video graphics array (VGA), etc. The display 930 may be any suitable type of display for displaying data transmitted via the display interface 902 of the computer system 900, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 908 and secondary memory 910, which may be memory semiconductors (e.g., DRAMs, etc.). These computer program products may be means for providing software to the computer system 900. Computer programs (e.g., computer control logic) may be stored in the main memory 908 and/or the secondary memory 910. Computer programs may also be received via the communications interface 924. Such computer programs, when executed, may enable computer system 900 to implement the present methods as discussed herein. In particular, the computer programs, when executed, may enable processor device 904 to implement the methods illustrated by FIGS. 1-7, as discussed herein. Accordingly, such computer programs may represent controllers of the computer system 900. Where the present disclosure is implemented using software executed on hardware, the software may be stored in a computer program product and loaded into the computer system 900 using the removable storage drive 914, interface 920, and hard disk drive 912, or communications interface 924.

The processor device 904 may comprise one or more modules or engines configured to perform the functions of the computer system 900. Each of the modules or engines may be implemented using hardware and, in some instances, may also utilize software executed on hardware, such as corresponding to program code and/or programs stored in the main memory 908 or secondary memory 910. In such instances, program code may be compiled by the processor device 904 (e.g., by a compiling module or engine) prior to execution by the hardware of the computer system 900. For example, the program code may be source code written in a programming language that is translated into a lower level language, such as assembly language or machine code, for execution by the processor device 904 and/or any additional hardware components of the computer system 900. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 900 to perform the functions disclosed herein. It will be apparent to persons having skill in the relevant art that such processes result in the computer system 900 being a specially configured computer system 900 uniquely programmed to perform the functions discussed above.

Techniques consistent with the present disclosure provide, among other features, an energy storage system and method employing second-life electric vehicle batteries. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A system for supplying power to a power grid, the system comprising:
a battery storage system including one or more electric vehicle (EV) battery packs, a battery pack controller communicatively coupled to the one or more EV battery packs, and a Supervisory Control and Data Acquisition (SCADA) communicatively coupled to the battery pack controller, each of the one or more EV battery packs including one or more batteries;
a power generator; and
a storage management system with a processor communicatively coupled to the SCADA of the battery storage system and the power generator, the processor configured to:
generate a first command to direct generated energy from the power generator to the battery storage system;
transmit the first command to the power generator;
determine a demand index based on power grid demand and supply data, the demand index indicating a predicted power demand from the power grid;
generate a second command to discharge battery-stored energy from the battery storage system to the power grid based on the demand index; and
transmit the second command to the SCADA of the battery storage system; and
in response to receiving the second command, the battery storage system discharges battery-stored energy from the battery storage system to the power grid.

2. The system according to claim 1, wherein the predicted power demand from the power grid is for the battery-stored energy.

3. The system according to claim 1, wherein the demand index includes market price for the battery-stored energy.

4. The system according to claim 1, wherein the second command to discharge battery-stored energy from the battery storage system to the power grid is further based on a state of charge of the battery storage system.

5. The system according to claim 1, wherein the processor is configured to:
forecast climate conditions for a photovoltaic generation system;
observe historical climate conditions for the photovoltaic generation system; and
discharge the battery-stored energy from the battery storage system to the power grid based on the demand index, and wherein the demand index includes the forecasted climate conditions for the photovoltaic system and the observed historical climate conditions for the photovoltaic generation system.

6. The system according to claim 5, wherein the processor is configured to:
store historical location marginal prices (LMPs) for delivery of electrical power to a day-ahead market (DAM); and
obtain one or more of the historical locational marginal prices (LMPs), the forecasted climate conditions for the photovoltaic generation system, and the observed historical climate conditions for the photovoltaic system from a structure query language (SQL) connection built into a discharge data workbook.

7. The system according to claim 5, wherein the power generator is a photovoltaic generation system and the generated energy is from the photovoltaic generation system, and the processor is configured to:
create a schedule for supplying surplus energy generated from the photovoltaic (PV) generation system to the power grid based on the forecasted climate conditions for the photovoltaic system and the observed historical climate conditions for the photovoltaic generation system.

8. The system according to claim 1, wherein the power generator is a photovoltaic generation system and the generated energy is from the photovoltaic generation system, and the processor is configured to:

project photovoltaic generation for a given time period based on an expected plane of array irradiance (POA IRR) forecast for the photovoltaic generation system;

input forecasted hourly ambient temperatures into a regression relationship to estimate back of module photovoltaic (PV) array temperatures for the photovoltaic generation system;

forecast generation of the generated energy from the photovoltaic generation system based on the incident irradiance and degradation due to estimated back of module PV array temperatures; and produce a final photovoltaic (PV) generation forecast for the photovoltaic system by adjusting the forecast generation based on an expected global horizontal irradiance (GHI) for the photovoltaic generation system.

9. The system according to claim 8, wherein the processor is configured to:

estimate the demand index in the day-ahead market (DAM) for the battery-stored energy; and determine one or more timeframes to discharge the battery-stored energy to the power grid in the day-ahead market (DAM) based on the demand index in the day-ahead market (DAM).

10. The system according to claim 1, wherein the power generator is a photovoltaic generation system and the generated energy is from the photovoltaic generation system, and the processor is configured to:

store a database of locational marginal prices (LMPs) for a defined region and forecasted climate conditions for the defined region;

estimate the demand index including the expected prices and forecasted climate conditions for the defined region at any given hour of any given day based on one or more of conditions and criteria, the one or more conditions and criteria including temperature, day of week, and past demand projections.

11. The system according to claim 10, wherein the processor is configured to:

determine one or more windows of time for the discharge of the battery-stored energy from the battery storage system to the power grid based on the demand index for the battery-stored energy from the battery storage system to the power grid and forecasted photovoltaic (PV) generation from the photovoltaic generation system to the battery storage system.

12. The system according to claim 1, wherein the EV battery packs are coupled in a series/parallel arrangement, the series/parallel arrangement including a plurality of series strings of electric vehicle battery packs, each of the plurality of series strings of electric vehicle battery packs includes at least two of the plurality of electric vehicle battery packs coupled in series, and wherein the plurality of series strings of electric vehicle battery packs are connected in parallel.

13. A method for supplying power to a power grid, the method comprising:

generating a first command directing generated energy from a power generator to a battery storage system, the battery storage system including one or more electric vehicle (EV) battery packs, a battery pack controller communicatively coupled to the one or more EV battery packs, and a Supervisory Control and Data Acquisition (SCADA) communicatively coupled to the battery pack controller, each of the one or more EV battery packs including one or more batteries;

transmitting the first command to the power generator;

determining a demand index based on power grid demand and supply data, the demand index indicating a predicted power demand from the power grid;

generating a second command to discharge battery-stored energy from the battery storage system to the power grid based on the demand index; and transmitting the second command to the SCADA of the battery storage system.

14. The method according to claim 13, wherein the predicted power demand from the power grid is for the battery-stored energy.

15. The method according to claim 13, wherein the demand index includes market price for the battery-stored energy.

16. The method according to claim 13, wherein the second command to discharge battery-stored energy from the battery storage system to the power grid is further based on a state of charge of the battery storage system.

17. The method according to claim 13, further comprising:

forecasting climate conditions for a photovoltaic generation system;

observing historical climate conditions for the photovoltaic generation system; and discharging the battery-stored energy from the battery storage system to the power grid based on the demand index, and wherein the demand index includes the forecasted climate conditions for the photovoltaic system and the observed historical climate conditions for the photovoltaic generation system.

18. The method according to claim 17, further comprising:

storing historical location marginal prices (LMPs) for delivery of electrical power to a day-ahead market (DAM); and obtaining the historical locational marginal prices (LMPs), the forecasted climate conditions for the photovoltaic generation system, and the observed historical climate conditions for the photovoltaic system from a structure query language (SQL) connection built into a discharge data workbook.

19. The method according to claim 13, wherein power generator is a photovoltaic generation system and the generated energy is from a photovoltaic generation system, and further comprising:

projecting photovoltaic generation for a given time period based on an expected plane of array irradiance (POA IRR) forecast for the photovoltaic generation system;

inputting forecasted hourly ambient temperatures into a regression relationship to estimate back of module photovoltaic (PV) array temperatures for the photovoltaic generation system;

forecasting generation of the generated energy from the photovoltaic generation system based on the incident irradiance and degradation due to estimated back of module PV array temperatures;

producing a final photovoltaic (PV) generation forecast for the photovoltaic system by adjusting the forecast generation based on an expected global horizontal irradiance (GHI) for the photovoltaic generation system;

estimating the demand index in the day-ahead market (DAM) for the battery-stored energy; and determining one or more time frames to discharge the battery-stored energy to the power grid in the day-ahead market (DAM) or real time market (RTM) based on the demand index in the day-ahead market (DAM) for the battery-stored energy.

* * * * *